May 22, 1923.
T. JOWETT ET AL
CALCULATING MACHINE
Filed Dec. 9, 1918
1,456,061
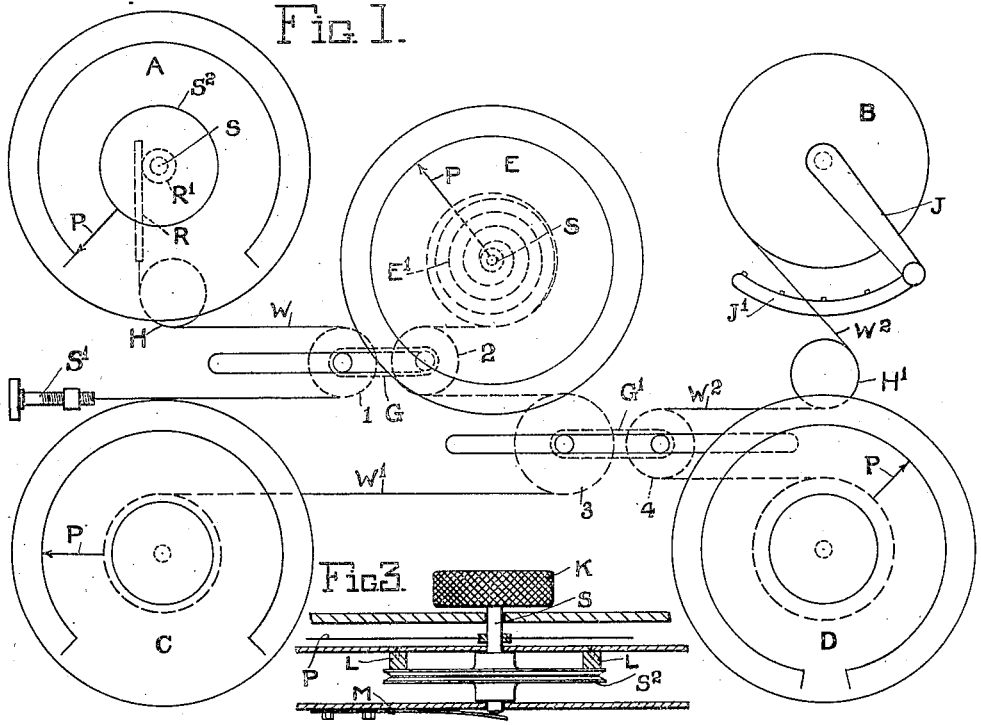
Fig. 1.
Fig. 3.
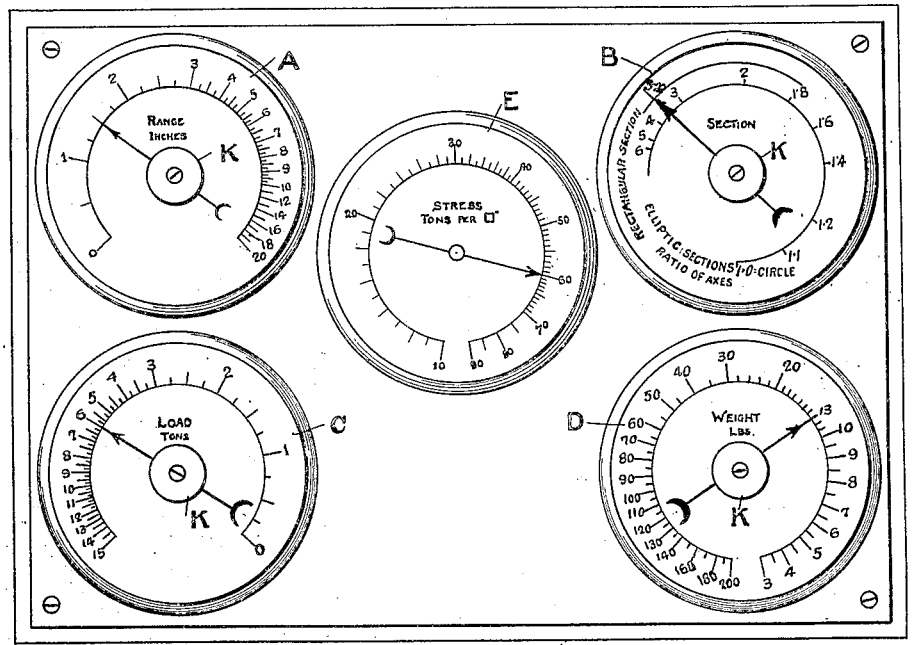
Fig. 2.
Inventors.
Thompson Jowett &
Cecil Edward Squire,
By S. Singer, Atty.

Patented May 22, 1923.

1,456,061

UNITED STATES PATENT OFFICE.

THOMPSON JOWETT, OF LONDON, AND CECIL EDWARD SQUIRE, OF SHEFFIELD, ENGLAND.

CALCULATING MACHINE.

Application filed December 9, 1918. Serial No. 265,896.

*To all whom it may concern:*

Be it known that we, THOMPSON JOWETT and CECIL EDWARD SQUIRE, both subjects of the King of Great Britain, and residents of London, England, and Sheffield, England, respectively, have invented certain new and useful Improvements in Calculating Machines, of which the following is a specification.

This invention relates to an improved calculating machine and has for its object to provide a machine by means of which unskilled persons can find by a mechanical operation the value of one or more unknown variables from other known variables and constants.

Where a number of factors are in a definite relationship, one or more variables depend on other variables and constants in a definite way, which can be expressed as an equation, and the invention consists broadly in providing a mechanical means of readily finding the value of one or more unknown variables when the others are known.

To take the simplest example of a given total weight and a total cost, the operator can mechanically determine the cost per unit of weight by the mechanical operation of moving pointers relative to two dials, drums or their equivalents, in accordance with the known factors, the solution being indicated upon a third dial, drum or equivalent. There is more than one way of accomplishing this although the principle is precisely the same in each case and may be stated in general terms as an apparatus comprising a number of co-operating dials and pointers the moving members of which are differentially interconnected so that the movement of some of them in accordance with known factors ensures a movement of another or others to give a desired solution or solutions in accordance with and dependent upon the known factors.

In the accompanying drawings we have illustrated examples of our invention diagrammatically, Fig. 1 being a diagram illustrating one method of carrying the invention into practice as applied to an apparatus adapted to deal with five variables, and Fig. 2 illustrates how the dials shown therein are calibrated in a particular machine constructed according to the invention, and showing the scale on member B reversed, such machine being used for making calculations for springs, as will be hereinafter fully described. Fig. 3 is a part sectional elevation of a combined actuating and braking mechanism.

Referring to these drawings and particularly to Fig. 1 the dials shown are stationary and are calibrated as shown in Fig. 2 and the moving parts of the indicating apparatus are the pointers P attached to spindles S and the hands J of dial B. On each spindle is also mounted a drum $S^2$ which may have a uniform or variable radius around which is wound one or more turns of stranded steel wire or strip or other flexible and inextensible material indicated by the letters W and $W^1$ and $W^2$. The example shown is arranged for five variables A B C D E, of which E is the one whose value is generally required to be ascertained and B has only a few definite values. The wire from the drum A passes over the pulley 1 on the carriage G which is mounted to move in a slide parallel to the wire W from A and is then anchored to an adjustable stop $S^1$. The wire $W^2$ from the drum B passes over pulley 4 on a similar carriage $G^1$ and then on to drum D. Generally but not always jockey pulleys such as H and $H^1$ are provided so that all the wires leading to or from the pulleys on the movable carriages do so in a direction parallel to line of movement of the carriages. The wire $W^1$ from the drum C passes first over the pulley 3 and then over pulley 2 and on to drum E.

As shown in Fig. 3, knurled knobs K or other suitable means (not shown) will be provided on extensions of the spindles for moving the pointers—and as a consequence the corresponding drums connected to them—to the desired points on the scales and brakes or other locking means L will be provided to make these spindles and drums friction tight so that while they can be moved by operation of the knobs they will not become displaced accidentally or by the reaction of the wire. The drum S² can be moved by the knurled knob K against the brake L, or the braking action may be removed by a slight pressure on the knob K at the same time as turning. The strength of the spring M and the radius at which the brakes act are suitably proportioned to prevent movement of the drum by accident or reaction of the wires. The spindle E has no knob or brake, but is provided with a spring E¹ tending to rotate the spindle in the opposite direction to the pull of the wire W¹ on the drum. This spring is not so strong as to cause rotation of the other drums and pointers but is sufficient to ensure that all the wires are always kept taut. In this machine what may be termed the "differential mechanism" consists of the movable pulleys 1, 2, 3, 4.

It sometimes happens that a variable has a number of definite values only and does not change gradually, or possibly the equation is applicable to more than one purpose as appropriate constants are used. In this case instead of setting the pointer to the values on the dial it may be more convenient to use other means such as the hand J moving over a scale J¹.

In all cases the ratio of the pulleys is suitably proportioned with the scales to give suitable readings according to the results and degree of accuracy required. Should it happen that this makes any drum too small for the wire to follow readily the drum may be replaced by rack and pinion as indicated by R and R¹. The pointers may make any portion of a revolution as desired. It is obvious that the invention is susceptible of many modifications in matters of detail and construction without departure from the principles of the invention. The scales are usually logarithmic but this is not an essential condition. It might be desired to have a scale equally divided or more open at one portion than another which can be readily accomplished by suitably shaping the drum, i. e., the radius would not be uniform and its action may be described as something between that of a fusee and a cam.

In operation the drum representing one of the known quantities would be moved till its value on the scale is indicated in which position the drum would be locked. The same procedure would be followed in respect of each of the known quantities. If there is only one unknown its value will then be indicated, if there are two or more unknowns there will be an indefinite number of values of these depending on each other, but in the case of two unknowns, there will be an infinite number of solutions possible but the machine will indicate any of these within the range it is designed for. In practical cases there is usually some value of either that will be most convenient and on selecting this, the value of the other is immediately indicated. As the two pointers can be turned continuously and simultaneously it is only the work of a moment to arrive at the most convenient solution and similarly when there are more than two, and in this way the solution is obtained.

The particular kind of equation a machine in accordance with our invention is specially adapted to deal with is of the type $a^m \times b^n \times c^o \times$ etc. $= X$ where there may be any number of variables and where the indices may have any value positive or negative, integral or fractional. This is the general type equation and is stated in its most general form to indicate the scope of the machine. One machine will certainly not deal with all equations of this class but only with the equation for which it is designed; but a machine can be designed and constructed on the principles laid down that will give all the solutions of any given equation of this type within the range it is designed for. Any of the letters may be variables but it generally happens that the indices are known and perhaps one or more of the other letters. It will depend on the particular equation how the machine is designed to deal with the exponent of the various factors. There are, however, two ways in particular which may be used either separately or in combination. The first is by the relative proportion of the scales. The second is by the relative proportion of the gearing or ratio of diameters of the various drums.

The principle upon which such an equation is solved will be better understood from the following detailed description of the mathematics of the embodiment illustrated.

In this embodiment the five variables which the machine is designed to deal with are:—

(1) Range in inches through which the spring moves.
(2) Load in tons applied to the spring.
(3) Surface or maximum stress in tons per sq. inch.
(4) Weight in lbs., of the active portion of the spring, and
(5) A variable depending on the shape of the cross section.

Symbolizing these variables respectively by R, L, S, W and K, the following formula expresses the relationship between them.

$$S = Q\sqrt{\frac{KRL}{W}}$$

Where Q is a constant.

The following is a clear description of the way in which the formula $$S = Q\sqrt{\frac{KRL}{W}}$$

is derived from matter contained in Morleys Strength of Materials: Referring to page 287 S 116 (third edition) or page 285 S 116 (second edition) from formula (1) for circular section $$\text{Resilience} = .25\frac{f^2}{N}\text{ volume}$$

$$\text{Resilience} = \frac{\text{range} \times \text{load}}{2}$$

Then $$\frac{\text{Range} \times \text{load}}{2} = \frac{.25\text{ stress}^2}{N} \times \frac{\text{weight}}{\text{weight per cubic inch}}$$

$$\text{Stress}^2 = (\text{weight per c. in.} \times N) \times \frac{1}{.25 \times 2} \times \frac{\text{range} \times \text{load}}{\text{weight}}$$

$$\text{Stress} = \sqrt{\text{weight per c. in.} \times N} \times \sqrt{2 \times \frac{\text{range} \times \text{load}}{\text{weight}}}$$

$$\text{For steel} = \sqrt{.28 \times 5000} \times \sqrt{2 \times \frac{R \times L}{W}}$$

$$= 37.65\sqrt{2 \times \frac{R \times L}{W}}$$

$$\text{or stress} = Q\sqrt{\frac{K \times R \times L}{W}}$$

where Q depends on the material = 37.65 for steel and K depends on the section = 2 for circular section. Exactly the same method is used for other sections as is clearly indicated in the last paragraph of S 116 on page 288; for example from formula (3) for square section:—

$$\frac{\text{Range} \times \text{load}}{2} = .154\frac{f^2}{N}\text{ volume.}$$

$$\text{Then stress} = Q\sqrt{\frac{1}{.154 \times 2}\frac{R \times L}{W}}$$

or $$\text{For steel} = 37.65\sqrt{3.25 \times \frac{R \times L}{W}}$$

Thus for square sections K = 3.25.

As aforestated the value of K can be found for all other sections by exactly the same method.

The values of K for different elliptical sections are as follows:—

| Ratio of sides of ellipse. | Value of K. |
|---|---|
| 1.0 | 2 |
| 1.2 | 2.12 |
| 1.4 | 2.6 |
| 1.6 | 2.9 |
| 1.8 | 3.1 |
| 2.0 | 3.2 |
| 3 | 3.6 |
| 4 | 3.7 |
| 5 | 3.8 |

From this it follows that $$\log S = \log Q + \tfrac{1}{2}(\log K + \log R + \log L - \log W).$$

or $$2\log S - \text{a constant} = \log K + \log R + \log L - \log W$$

or $$2\log S + \log W - \log K - \log R - L = \text{a constant.}$$

Turning now to the drawings it will be seen that:—$G^1 \times$ pointer movement on E+$G^2 \times$ pointer movement on D—$G^3 \times$ pointer movement on B+$G^4 \times$ pointer movement on A—$G^5 \times$ pointer movement on C=A constant where $G^1$, $G^2$, $G^3$, $G^4$ and $G^5$ are constants depending on the dimensions of the individual pointers drums and pulley wheels.

Therefore

Pointer movement on E is proportional to log S, whilst pointer movement on D is proportional to log W and pointer movement on B is proportional to log K and pointer movement on A is proportional to log R and pointer movement on C is proportional to log L.

Therefore by assigning a logarithmic scale of suitable size to each dial the apparatus can be made such that the readings recorded on the dials at any moment are always in accordance with the above equation. The actual size of each logarithmic scale is as will have been made clear, dependent on the dimensions of the apparatus and it is therefore better found empirically i. e., by a system of trial and error than by means of a very elaborate calculation. In the case of scale B, as the variable K as above stated depends on the cross sectional shape of the spring, it has been found more convenient to calibrate dial B to a number of different scales each for a certain cross sectional type, than to calibrate it to a scale expressing K directly.

As a practical example of the manner in which the machine is adapted to be operated we will quote actual figures taken from a test sheet supplied by the operator of a machine in finding the maximum fibre stress of a spring of rectangular section.

The outside base measurement of the spring was 5", the inside top 1⅜", the finished section 1 13/16"×9/16", the total weight 15½ pounds, and the number of coils 6⅜.

The total height of the spring was 4 13/16" at no load and 3 5/16" under a load of 6 tons. From these figures we get the following:—

Range 4 13/16" − 3 5/16" = 1½.
Ultimate load 6 tons.
Section ratio 1 13/16 to 9/16 = 29 to 9 = 3.22 to 1.
Effective weight (found by deducting from the total weight the weight of one coil to allow for the ends which are not subject to deflection or stress).

$$15\tfrac{1}{2} \times \frac{5\tfrac{1}{8}}{6\tfrac{3}{8}} = \frac{31}{2} \times \frac{41}{49} = 13 \text{ pounds.}$$

On setting the pointer on dial A to 1½", the pointer on dial C to 6 tons, the pointer on dial D to 13 lbs. and the pointer on dial B to ratio 3.22 on the rectangular section scale, the pointer on dial E is found to move to 60 tons.

The constant Q for the spring in question was 37.65 and the actual value of K for rectangular section ratio 3.22 is 3.66. If these figures are substituted in the above formula and the value of S calculated by four figure logarithms it will be found to be 59.96 tons.

By means of our machine, not only can the result be obtained more quickly than heretofore, but, given the necessary data, a totally unskilled person can obtain the result from the machine by merely manipulating the pointers as above indicated.

What we claim and desire to secure by Letters Patent is:—

1. A calculating machine comprising a plurality of dials, a corresponding number of rotatable drums, indicators attached to and adapted to move with said drums, a pulley mounted upon a movable carriage, a flexible lead passing over said pulley and having its ends wound upon two of said drums each to each, and a second flexible lead having one end wound upon a third of said drums and having connections with said movable carriage such that rotation of said third drum tends to effect movement of said carriage and vice versa.

2. A calculating machine according to claim 1 including a second pulley mounted upon said movable carriage, said second lead passing from said third drum over said second pulley and being attached to a fixed point.

3. A calculating machine comprising a plurality of dials, a corresponding number of rotatable drums, indicators attached to and adapted to move with said drums, two pulleys mounted upon a common movable carriage, a flexible lead passing over one of said pulleys and having its two ends wound upon two of said drums each to each, a second flexible lead passing over the other of said pulleys and having its two ends wound upon two other of said drums each to each.

4. A calculating machine according to claim 3 including a third pulley mounted upon a second movable carriage and a third flexible lead wound upon a fifth drum and having connections with said second movable carriage such that rotation of said fifth drum tends to effect movement of said second carriage and vice versa and said second movable carriage also having connection with the second flexible lead such that movement of said second movable carriage tends to effect movement of said second lead and vice versa.

5. A calculating machine according to claim 2, wherein said first and second flexible leads pass to and from said first and second pulleys respectively in a direction parallel to the direction of movement of said carriage.

6. A calculating machine according to claim 1, wherein logarithmic scales are inscribed on said dials.

In witness whereof we affix our signatures.

THOMPSON JOWETT.
CECIL EDWARD SQUIRE.